(12) United States Patent
Sato et al.

(10) Patent No.: US 8,493,838 B2
(45) Date of Patent: Jul. 23, 2013

(54) DEVICE MANAGEMENT SYSTEM

(75) Inventors: Toshitaka Sato, Ibaraki (JP); Yuuki Kasai, Beijing (CN); Hideki Fujimura, Neyagawa (JP)

(73) Assignee: Panasonic Corporation, Osaka (JP)

( * ) Notice: Subject to any disclaimer, the term of this patent is extended or adjusted under 35 U.S.C. 154(b) by 319 days.

(21) Appl. No.: 12/989,776

(22) PCT Filed: Apr. 24, 2009

(86) PCT No.: PCT/JP2009/058176
§ 371 (c)(1),
(2), (4) Date: Oct. 26, 2010

(87) PCT Pub. No.: WO2009/133819
PCT Pub. Date: Nov. 5, 2009

(65) Prior Publication Data
US 2011/0047259 A1   Feb. 24, 2011

(30) Foreign Application Priority Data

Apr. 30, 2008   (JP) ................................. 2008-119228

(51) Int. Cl.
*H04L 1/00*   (2006.01)
(52) U.S. Cl.
USPC ........... 370/216; 370/217; 370/218; 370/254; 709/223; 709/219
(58) Field of Classification Search
USPC .......... 370/216, 217, 218, 219, 220; 709/223, 709/221; 714/4
See application file for complete search history.

(56) References Cited

U.S. PATENT DOCUMENTS

| | | | |
|---|---|---|---|
| 6,791,940 B1 * | 9/2004 | Rajesh | 370/219 |
| 2004/0047286 A1 * | 3/2004 | Larsen et al. | 370/216 |
| 2010/0017646 A1 * | 1/2010 | Nakagawa et al. | 714/4 |

FOREIGN PATENT DOCUMENTS

| | | |
|---|---|---|
| JP | 8-123747 A | 5/1996 |
| JP | 2002-183855 A | 6/2002 |
| JP | 2003-50617 A | 2/2003 |
| JP | 2007-96539 A | 4/2007 |
| JP | 2008-15837 A | 1/2008 |
| JP | 2008-181240 A | 8/2008 |

OTHER PUBLICATIONS

International Search Report for the Application No. PCT/JP2009/058176 mailed Jul. 21, 2009.

* cited by examiner

*Primary Examiner* — Ian N Moore
*Assistant Examiner* — Hien Nguyen
(74) *Attorney, Agent, or Firm* — Renner, Otto, Boisselle & Sklar, LLP (57) ABSTRACT

When the alternate unit detects the failure of the area unit, the alternate unit obtains the program corresponding to the program type of the area unit having the failure. The alternate unit sets the IP address of the area unit, and obtains the setting information from the management unit belonging to the area same as the area including the area unit having the failure. Then, the alternate unit collects the data from the units which previously communicate with the area unit having a failure and previously communicating with the area unit. The alternate unit performs the initialization and starts the management of the unit. Consequently, it is possible to continuously manage the sub unit being previously managed by the main unit, now having a failure, without stopping the management of the sub unit, even if the main unit is failed.

6 Claims, 5 Drawing Sheets

DEVICE MANAGEMENT SYSTEM

TECHNICAL FIELD

This invention relates to a device management system being configured to manage a plurality of devices which belongs to a plurality of management group, respectively.

BACKGROUND ART

In the prior art, the device management system is configured to manage a plurality of devices. ("manage" means "at least one of the "monitor" and "control".) A plurality of the devices belong to a plurality of the management groups, respectively. The management groups are categorized on the basis of a sort of the devices and a place of the devices. Consequently, the device management system constructs inferior communication networks. A plurality of the devices belong to a plurality of the management groups, respectively. The inferior communication networks are managed by the ancestor communication network. When these communication networks construct the hierarchized communication network, the technology of managing sub units by a main unit is employed. In this technology, the sub units are arranged in the inferior communication network so as to manage devices, and the main units are arranged in the superior communication network so as to include the sub units as terminals. (The sub unit includes "a sub unit with the device", in the broad sense.) The main unit is configured to communicate with the sub unit with using a communication protocol. The communication protocol is exemplified by BACnet in the Japanese patent application publication No. 2007-96539. (BACnet is "A Data Communication Protocol for Building Automation and Control Networks".)

However, in the device management system of the prior art, if the main unit is failed, the main unit having a failure is not capable of managing the sub units which are managed by the main unit. As a result, the prior device management system has a problem of that it is impossible to manage the devices under the sub unit which is managed by the main unit having the failure.

DISCLOSURE OF THE INVENTION

This invention is achieved to solve the above problem. The object in this invention is to produce the device management system being configured to continuously manage sub units which is previously managed by the main unit which becomes failed, even if the main unit becomes failed.

The device management system in this invention is provided for management of a plurality of devices respectively which belong to a plurality of management groups different from each other. The device management system comprises a plurality of main units, a plurality of sub units, and an alternate unit. A plurality of the main units are disposed in the management groups, respectively. A plurality of the main units comprises a first main unit disposed in a first management group, and a second main unit disposed in a second management group. A plurality of the sub units comprising at least one first sub unit disposed in a first management group, and at least one second sub unit disposed in a second management group. The first main unit is configured to perform communication with the first sub unit so as to perform management of the first sub unit. The second main unit is configured to perform communication with the second sub unit so as to perform management of the second sub unit. The first sub unit is connected to a first device belonging to the first management group. The first sub unit is configured to manage the first device according to the management of the first main unit. The second sub unit is connected to a second device belonging to the second management group. The second sub unit is configured to manage the second device according to the management of the second main unit.

The alternate unit comprises a detection means and an alternate means. The detection means is configured to detect a failure of the first main unit. The detection means is configured to detect a failure of the second main unit. The alternate means is configured to perform communication with the first sub unit so as to perform management of the first sub unit when the detection means detects the failure of the first main unit. The alternate means is configured to perform communication with the second sub unit so as to perform management of the second sub unit when the detection means detects the failure of the second main unit.

The alternate unit being configured to manage the sub unit, similar to each the main units, makes it possible to continuously manage the sub unit instead of the main unit having the failure when the main unit becomes failed. That is, this configuration makes it possible for the device management system to continuously manage the sub unit which is previously managed by the main unit which becomes failed, without stopping the management of the sub unit.

It is preferred that the first main unit having a priority which is higher than a priority of the second main unit. The alternate means is configured to perform the communication with the first sub unit so as to perform the management of the first sub unit when the detection means detects the failures of both the first main unit and the second main unit.

With this configuration, the alternate unit is configured to manage the main unit having a highest priority instead of the main unit having a highest priority when a plurality of the main units becomes failure. Consequently, it is possible to continuously manage critical unit without stopping the management of the critical unit.

It is preferred that the device management system further comprises an information server. The information server having a first setting information and a second setting information. The first setting information is used when said first main unit performs the communication with said first sub unit. The second setting information is used when said second main unit performs the communication with said second sub unit.

The alternate unit further comprising an obtaining means and a storage means. The obtaining means is configured to obtain the first setting information from the information server when the detection means detects the failure of the first main unit. The obtaining means is configured to obtain the second setting information from the information server when the detection means detects the failure of the second main unit. The storage means is configured to store the first setting information which is obtained by the obtaining means. The storage means is configured to store the second setting information which is obtained by the obtaining means. The alternate means is configured to use the first setting information in order to perform the communication with the first sub unit for the management of the first sub unit when the detection means detects the failure of the first main unit. The alternate means is configured to use the second setting information in order to perform the communication with the second sub unit for the management of the second sub unit when the detection means detects the failure of the second main unit.

That is, the information server stores the setting information of each the main units. Therefore, with this configuration, it is not necessary for the alternate unit to store all the setting information of the main units in advance, even if the setting information are different for each the main units. In addition, the alternate unit is capable of obtaining the setting information from the information server when the alternate unit needs the setting information. Therefore, this configuration makes it possible to reduce the load of the alternate unit.

It is preferred that the detection means is configured to detect a restoration of the first main unit when the first main unit restores, and is configured to detect a restoration of the second main unit when the second main unit restores. The alternate means is configured to stop the communication with the first sub unit when the detection means detects the restoration of the first main unit. The alternate means is configured to stop the communication with the second sub unit when the detection means detects the restoration of the second main unit. The first main unit is configured to resume the communication with the first sub unit when the first main unit is restored. The second main unit is configured to resume the communication with the second sub unit when the second main unit is restored.

With this configuration, when the main unit having the failure is restored, the alternate unit stops the communication with the sub unit. Consequently, the alternate unit is capable of supporting the any of the main unit when any of the main unit becomes failure.

BEST MODE FOR CARRYING OUT THE INVENTION (First Embodiment)

In this invention, "monitoring the operation condition of each device" and "controlling each the device" are referred to as "managing" the device. Therefore, management of the devices indicates at least one of "the monitoring of the device" and "the control of the device". In addition, in this invention, the regions for disposing the devices to be managed are collectively defined as a management region. When the management region is divided into a plurality of divided regions, each one of the divided regions area is defined as an "area".

The management region is a space which is broad. The space is provided for placing a plurality of the devices. The device is exemplified by lighting devices and heating, ventilation, and air-conditioning apparatus. The space which is broad is exemplified by "grounds of buildings and collective housings", "a block of residential sections", and "parks and theme parks". The buildings are exemplified by a office building, a collective housing, a school, a hospital, a gymnastic hall, an art museum, a museum, and a shopping center. The ground of the collective housings is provided with a plurality of housings. A block of the residential sections includes a plurality of the housings. In contrast, the area corresponds to the floor of the building or the room of the building. In addition, the area is also recognized as sections which are provided by dividing the ground.

Figure 2:
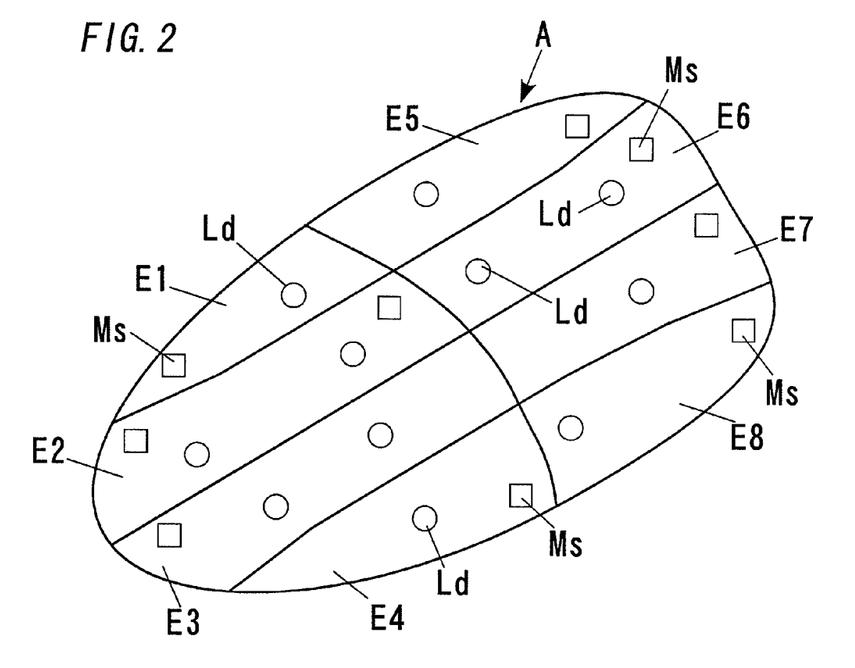
FIG. 2 shows a relationship between the management region and the area of the above.

Hereinafter, an explanation is made in a case where the management region A is defined as an entire of the park shown in FIG. 2. The park is arbitrarily divided into a plurality of the areas, whereby the park includes a plurality of areas E1 to E8. In one example of the drawing, the management area A is divided into eight areas E1 to E8. If there is no need to distinguish the areas E1 to E8 each other, the areas E1 to E8 are collectively called as the area E.

In this embodiment explained in later, the device to be monitored and controlled is exemplified by a lighting device. The device to be monitored is exemplified by a measurement device being configured to measure value such as the voltage value, current value, and electrical power.

Hereinafter, the explanation of the configuration of the device management system of this embodiment is made. The device management system is configured to manage a plurality of the devices which belongs to a plurality of the areas E1 to E8, respectively. (A plurality of the areas E1 to E8 are defined as a plurality of management groups.) The device management system comprises a plurality of area units 1, 1, a plurality of units 2, 2, and a plurality of management units 3, 3. In this embodiment, the number of the area units 1, 1 is two. The number of the units 2, 2 is eight. The number of the management unit 3, 3 is two. Furthermore, the device management system further comprises a superior management device 4 and an alternate unit 5. The area units 1, 1 are provided to the areas E, respectively. Each the unit 2 is configured to manage the corresponding area unit 1 on the basis of the management instruction which is sent from the corresponding area unit 1. Each the management unit 3 is configured to store the setting information for setting the area unit 1, explained later. The alternate unit 5 is configured to manage the unit 2 instead of the area unit 1, explained later.

Figure 1:
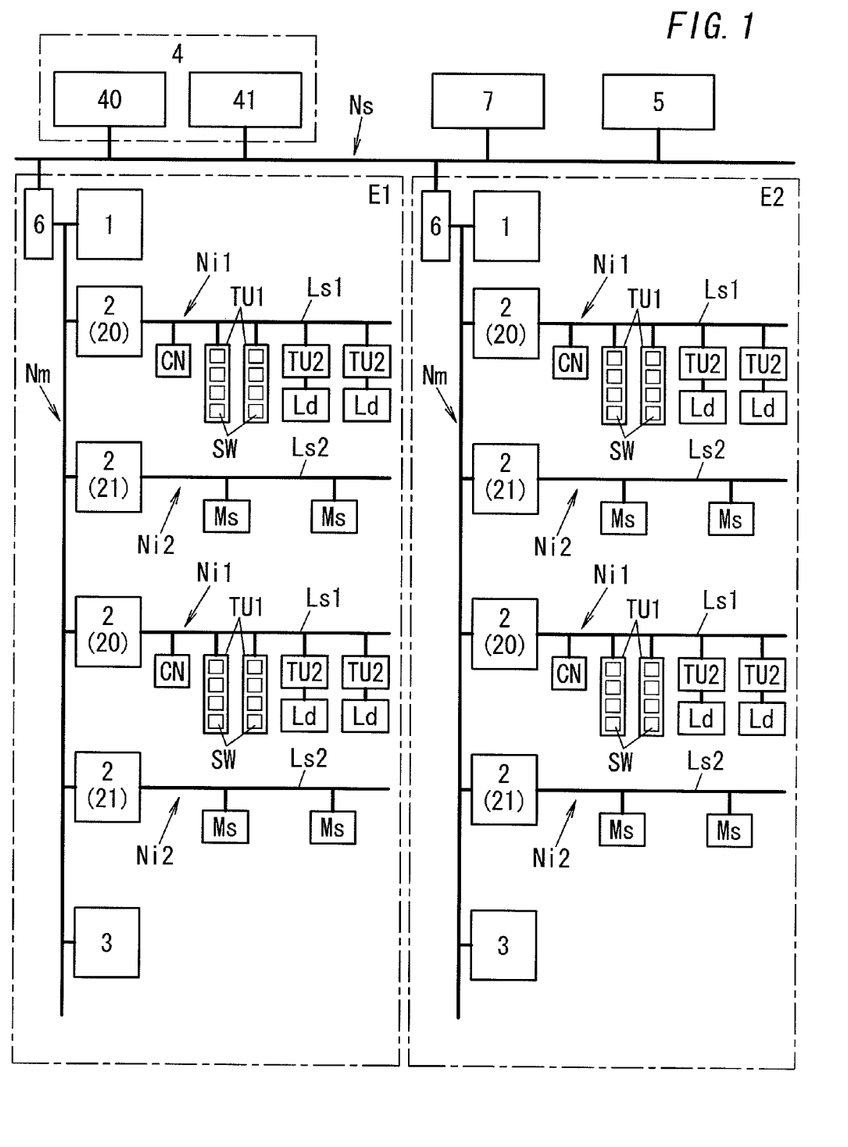
FIG. 1 shows a schematic view of the device management system in the first embodiment.

The device management system in this embodiment employs the communication network shown in FIG. 1 in order to manage each the devices. The communication network shown in the drawing has a hierarcal structure to have three hierarchy levels. The communication network Nm of the intermediate layer is referred to as an intermediate net Nm. The intermediate net Nm is disposed such that the communication networks Ni1, Ni2 of the lower layer subordinates to the intermediate net Nm. The communication networks Ni1, Ni2 of the lower layer are referred to as the inferior nets Ni1, Ni2. The intermediate net Nm and the inferior nets Ni1. Ni2 are disposed such that the lighting device controlling units 20 and the measurement management unit 21 are located between the intermediate net Nm and each the inferior net Ni1, Ni2. The intermediate net Nm is disposed such that the communication network in a superior layer Ns is superior to the intermediate net Nm. The communication network in a superior layer Ns is referred to as the superior net Ns. The intermediate net Nm and the superior net Ns are disposed such that a router 6 is located between the intermediate net Nm and the superior net Ns. The intermediate net Nm is connected to the area unit 1 and the management unit 3. The intermediate net Nm uses an IP protocol in the network layer. The intermediate net Nm uses the BACnet protocol in the superior protocol. The BACnet protocol is a standard open protocol of the devices Ms.

In the superior net Ns, an IP protocol corresponding to IPv6 is used in the network layer. The superior net Ns uses a unique protocol as the superior protocol. The superior net Ns is connected to the superior management device 4 which includes a center server 40 and a management computer 41. The superior net Ns is a local area network. However, the superior net Ns is connected to the NTP server 7. (The NTP server 7 is equal to Network Time Protocol server.)

The lower net Ni1 which is connected to the lighting device controlling units 20 constructs the communication network using a time division multiplex transmission method. The communication network using the time division multiplex transmission method uses the transmission signal having a fixed length which is transmitted through the signal wire Ls1 having two wire system. The lower net Ni2 connected to the measurement management unit 21 constructs the communication network using the serial communication such as RS-485 and RS-232C, and the communication network such as Ethernet (registered trademark). Consequently, the inferior net Ni2 transmit and receive the information through the signal wire Ls2.

The inferior net Ni1 comprises a transmission device CN, an operation terminal unit TU1, and a control terminal unit TU2. The transmission device CN is configured to send the transmission signal having the fixed length to the signal wire Ls1, periodically. The operation terminal unit TU1 and the control terminal unit TU2 are connected to the signal line Ls1. The operation terminal unit TU1 is provided with a switch SW. The control terminal unit TU2 is connected to the lighting device Ld. The operation terminal TU1 has addresses corresponding to the switches SW respectively. The control terminal unit TU2 has addresses which correspond to the lighting devices Ld to be controlled by the corresponding control terminal TU1. The transmission device CN holds a correlation table which associates each the address of the switch SW with the corresponding address of the lighting device Ld. Therefore, when any one of the switches SW is operated, "the lighting device Ld which corresponds to the switch SW and which is correlated by the correlation table" is turned on or turned off. It is noted that it is possible to employ a device such as a brightness sensor and a occupancy sensor equivalent to the switch SW, instead of the switch SW. Consequently, the transmission device CN is configured to control the lighting device to turn on and to turn off on the basis of "brightness" and "occupancy or non-occupancy of the human".

The lighting device controlling unit 20 is connected to the signal wire Ls1. Therefore, the lighting device controlling unit 20 is configured to monitor the transmission signal so that the lighting device controlling unit 20 recognizes the operation condition of the lighting device Ld. In addition, the lighting device controlling unit 20 is configured to perform the operation, similar to the operation terminal unit TU1. Therefore, the lighting device controlling unit 20 is configured to turn on and turn off the lighting device Ld, similar to the switch SW.

The measurement management unit 21 is connected to the signal wire Ls2. The signal wire Ls2 is connected to the measurement device Ms which is a component of the inferior net N12. The measurement management unit 21 is configured to communicate with the measurement device Ms by means of the serial communication. Consequently, the measurement management unit 21 gives the indication to the measurement device Ms. In addition, the measurement management unit 21 receives the information from the measurement device Ms. The measurement device Ms is configured to measure the value such as "instantaneous values of the voltage, the electrical current, and the electrical power of the lighting device Ld under the operation" and "integration values of the voltage, the electrical current, and the electrical power of the lighting device Ld under the operation". Therefore, the measurement management unit 21 is configured to obtain the measurement information from the measurement device Ms, whereby the management unit 21 monitors the operation of the lighting device Ld.

The area unit 1 is configured to use the setting information, explained below, to communicate with the lighting device controlling unit 20. Consequently, the area unit 1 is configured to obtain the operation condition of the lighting device Ld from the lighting device controlling unit 20, and to send indication indicating the operation condition of the lighting device Ld to the lighting device controlling unit 20. In addition, the area unit 1 is configured to communicate with the measurement management unit 21 so as to obtain the measurement information which is measured by the measurement device Ms. The setting information includes "a communication setting information data" and "a device management setting information data".

The communication setting information data includes "a source IP address indicating the source from which the communication setting information data is sent", "a destination IP address indicating the destination to which the communication setting information data is sent", and "a broadcast address indicating the address in the area E". Furthermore, the communication setting information data includes a correlation table. The correlation table correlates "the IP address of each the unit 2 (such as lighting device controlling unit 20 and the measurement management unit 21) connected to the area unit 1" with "each the management number". It is noted that each the management number is a number for managing the unit 2 (such as lighting device controlling unit 20 and the measurement management unit 21) individually.

The device management setting information data includes a maximum information and an actual information, the maximum information indicates the maximum number of the units (the area unit 1, the lighting device controlling unit 20, the measurement management unit 21, and the management unit 3) which are connectable to the area unit 1 within the area E, and the actual information indicates the number of the unit actually connected to the area unit 2 in the are E.

The area unit 1 is configured to send the acquisition request to the lighting device controlling unit 20 under the management of the lighting device controlling unit 20. The acquisition request is produced for requesting the lighting device controlling unit 20 to send the operation condition of the lighting device Ld under the management of the lighting device controlling unit 20 to the lighting device controlling unit 20. Consequently, the area unit 1 obtains the information indicative of the operation condition of the lighting device Ld. When the area unit 1 obtains the information indicative of the operation condition, the area unit 1 sends the information indicative of the operation condition to the superior management device 4. When the area unit 1 receives the control instruction for controlling the lighting device Ld from the superior management device 4, the lighting device controlling unit 20 requests the lighting device controlling unit 20 to control the lighting device Ld.

The management unit 3 stores the sort of the device (the lighting device Ld and the measurement device Ms) included in the intermediate net Nm and the inferior net Ni1, Ni2, and also stores the communication address of the device (the lighting device Ld and the measurement device Ms) included in the intermediate net Nm and the inferior net Ni1, Ni2. Furthermore, the management unit 3 holds the setting information of each the area unit 1. In addition, the management unit 3 is configured to store "the data given to each the unit (the lighting device controlling unit 20, the measurement management unit 21, and the area unit 1)" as the backup data for backup. That is to say, the management unit 3 stores the backup data. Therefore, after the area unit 1 is repaired or changed, the management unit 3 is capable of sending the backup data to the area unit 1. Consequently, the management unit 3 is capable of restoring the area unit 1.

Subsequently, the configurations of each the unit (the area unit 1, the lighting device controlling unit 20, the measurement management unit 21, and the management unit 3) acting as the terminal of the intermediate net Nm is explained, specifically. The area unit 1 has a hardware which is in common with hardware of the lighting device controlling unit 20, the measurement management unit 21, and the management unit 3. In contrast, the area unit 1, the lighting device controlling unit 20, the measurement management unit 21, and the management unit 3 is different in software from each other. Therefore, the construction of the hardware of the area unit 1 is explained as representative. The area unit 1 in this embodiment corresponds to the main unit in this invention. The unit 2 (the lighting device controlling unit 20 and the measurement management unit 21) corresponds to the sub unit in this invention.

Figure 3:
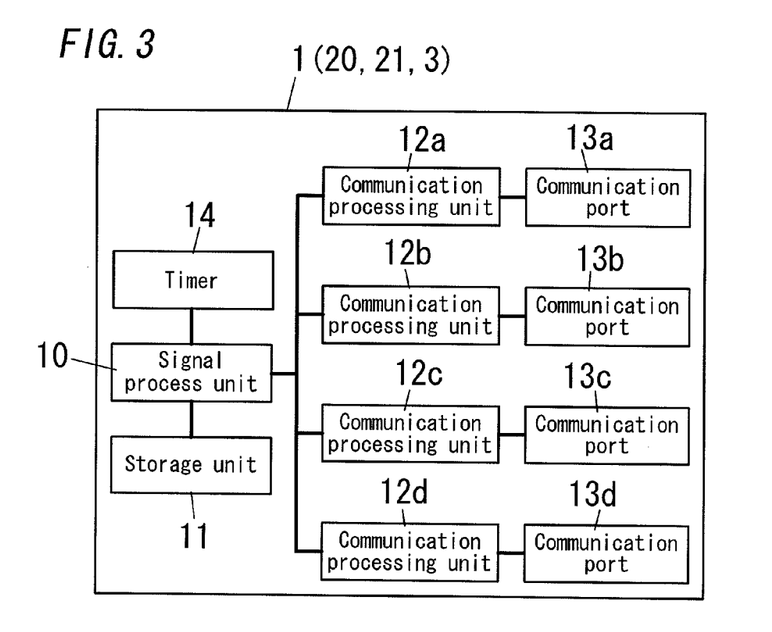
FIG. 3 shows a block diagram indicating the configuration of the area unit of the above.

As will be understood from FIG. 3, the area unit 1 comprises a signal process unit 10 and the memory unit 11. Furthermore, the area unit 1 comprises a plurality of the communication processing units, a plurality of the communication ports, and a timer 14. (In this embodiment, the area unit 1 comprises four communication processing units 12a to 12d and four communication ports 13a to 13d.) The signal process unit 10 is realized by CPU comprising a microcomputer as a main component. The storage unit 11 comprises a RAM and a ROM. (The ROM is exemplified by a flash ROM which is detachably attached.) Each one of the communication processing units 12a to 12d corresponds to each one of the communication methods having sorts different from each other. The communication ports 13a to 13d are provided for establishing the connection between each one of the communication processing unit 12a to 12d and each one of the electrical cables in the outside. The timer 14 is configured to measure current time.

The communication processing unit 12a and the communication port 13a comply with the inferior net Ni1 connected to the lighting device Ld. The communication processing unit 12b and the communication port 13b comply with the inferior net Ni2 which has RS-485 standard and which is connected to the measurement device Ms. (It is noted that the network complying with the RS-232C standard for serial communication is capable of employing as the inferior net Ni2.) The communication processing units 12d, 12d and the communication ports 13d, 13d comply with the intermediate net Nm which has Ethernet standard (registered trademark). Each one of the communication processing units 12a to 12d is configured to generate the communication packet which is sent through each one of the communication ports 13a to 13d, and is configured to extract the data from the communication packet which is received through each one of the communication ports 13a to 13d. Each one of the communication ports 13a to 13d has a shape which is adapted to be connected to the communication line complying with the inferior nets Ni1. Ni2 and the intermediate net Nm.

The storage unit 11 is configured to store program including the indication which enables the signal process unit 10 to perform the operation. In addition, the storage unit 11 stores the data which is required for enabling the area unit 1 to perform the operation. The data stored in the storage unit 11 has "a communication setting information data" and "a device management setting information data". The communication setting information data is a data which is required for establishing the communication by the communication processing units 12 to 12d and the communication ports 13a to 13d. The device management setting information data is a data which is required for management of the devices (the lighting devices Ld and the measurement devices Ms). The timer 14 is configured to output time information when the timer 14 receives the time information requirement. The time of the timer 14 is adjusted to coincide with the time of the NTP server 7 by a timer adjustment function which is achieved by the signal process unit 10.

The signal process unit 10 is configured to perform according to the program stored in the storage unit 11. The lighting device controlling units 20 and the measurement management unit 21 connected to the inferior nets Ni1, Ni2 have a monitoring and controlling function. The monitoring and controlling function is a function of managing the devices (lighting device Ld and the measurement device Ms) through the communication processing units 12a, 12b and the communication ports 13a, 13b. In contrast, each the area unit 1 which is indirectly connected to the inferior nets Ni1, Ni2 has a monitoring and controlling function, a web service function, and a timer adjusting function. The monitoring and controlling function is a function of sending and receiving a device management information for management of the devices (the lighting device Ld and the measurement device Ms). The area units 1 is configured to send the device management information to the lighting device controlling unit 20 (or the measurement management unit 21) through the communication processing units 12c, 12d and the communication ports 13c, 13d. The area unit 1 is configured to receive the device management information which is sent from the lighting device controlling unit 20 (or the measurement management unit 21) through the communication processing units 12c, 12d and the communication ports 13c, 13d. The web service function is a function which enables the superior management device 4 to display the information obtained from the lighting device controlling unit 20 and the measurement management unit 21. The timer adjusting function is a function which enables the area unit to communicate with the NTP server 7 in order to adjust the time of the timer 14 to the time of the NTP server 7. Each one of the above functions is realized when the signal process unit 10 performs the program stored in the storage unit 11.

Next, an explanation of the operation of the lighting device shown in FIG. 1 is made. When the lighting device controlling unit 20 is activated, the lighting device controlling unit 20 performs the initialization. The lighting device controlling unit 20 sends the acquisition request to the transmission device CN in order to obtain a system condition. The system condition indicates the information such as "an existence or nonexistence of the disconnection and short circuit" and "an existence or nonexistence of an incorrect setting of the address of the operation terminal unit TU1 or the control terminal unit TU2". (The transmission device CN prohibits a duplicate address of the operation terminal unit and the control terminal unit.) When the system condition is correct, the lighting device controlling unit 20 obtains the operation condition whether each the lighting device has on-state or off-state.

When the lighting device controlling unit 20 receives the acquisition request of requesting the lighting device controlling unit 20 to send "the system condition" and "the on-state-off-state condition which indicates whether the lighting device Ld has on-state or off-state" through the intermediate net Nm, the lighting device controlling unit 20 sends "the system condition" and "the on-state-off-state condition" to the source device from which the acquisition request is sent. (Normally, the source device is the area unit 1. However, there is a possibility that the source device is the superior management device 4.) When the lighting device controlling unit 20 detects that the system condition indicates an abnormal condition, the lighting device controlling unit 20 sends the abnormality to the source device.

In contrast, the lighting device controlling unit 20 is configured to make a judgment of whether the acquisition request of the information is sent through the intermediate net Nm or not. In addition, the lighting device controlling unit 20 is configured to make a judgment of whether the control instruction of the lighting device Ld is sent or not through the intermediate net Nm after the lighting device controlling unit sends the information to the source device from which the acquisition request is sent. When the lighting device controlling unit 20 recognized the existence of the control instruction, the lighting device controlling unit 20 controls the lighting device Ld according to the acquisition of the control instruction.

When the measurement management unit 21 is activated, the measurement management unit 21 performs an initialization. The measurement management unit 21 obtains the system condition of the inferior net Ni2 under the management of the measurement management unit 21. The system condition indicates the information such as "an existence or nonexistence of the disconnection and short circuit of the signal wire Ls2" and "an existence or nonexistence of a failure of the measurement device Ms". When the system condition is normal, the measurement management unit 21 obtains the measurement information from each the measurement device Ms.

When the measurement management unit 21 receives the acquisition request of requesting the management unit 21 to send the system condition and the measurement information through the intermediate net Nm, the measurement management unit 21 sends the system condition and the measurement information to the source device. (Normally, the source device is the area unit 1. However, there is a case that the source device is the superior management device 4, explained below.) It is noted that the measurement management unit 21 is configured to send the abnormality indicating the condition where the system condition has abnormality to the source device when the measurement management unit 21 detects the abnormality of the system condition.

As explained above, the lighting device controlling unit 20 and the measurement management unit 21 has the hardware which is in common with the area unit 1. However, the storage units 11 (shown in FIG. 3) of the lighting device controlling unit 20 and the measurement management unit 21 store the program which are different from the program which is stored in the storage unit 11 of the area unit. In other words, it is possible to use both the lighting device controlling unit 20 and the measurement management unit 21 as the area unit 1 only by varying the program.

The lighting device controlling unit 20 and the management unit 21 are configured to mediate between the intermediate net Nm and each one of the inferior nets Ni1 and Ni2. Consequently, each the storage unit 11 of the lighting device controlling unit and the measurement management unit stores the address which is used in the intermediate net Nm and the address which is used in each one of the inferior nets Ni1, Ni2. (The address used in the intermediate net Nm includes not only the IP address but also the cognitive information of the BACnet. The addresses used in the inferior nets Ni1, Ni2 are addresses for distinguishing the lighting device Ld from the measurement device Ms.) The address of the measurement device Ms is used in the serial communication of RS-485 standard.

The lighting device controlling unit 20 has a monitoring function and a controlling function. The monitoring function enables the lighting device controlling unit 20 to obtain the monitoring information indicative of the on-state or off-state of the lighting device Ld, and to send the monitoring information to the area unit 1. The lighting device controlling unit 20 is configured to receive the controlling information of instructing the lighting device controlling unit 20 to turn on or turn off the lighting device Ld from the area unit 1. The controlling function enables the lighting device controlling unit to reflect the controlling information to the lighting device Ld corresponding to the lighting device controlling unit 20. The measurement management unit 21 has a monitoring function. The monitoring function enables the measurement management unit 21 to obtain the measurement information from the measurement device Ms to be monitored by the corresponding measurement management unit 21, and to send the measurement information to the area unit 1.

The storage unit 11 of the management unit 3 stores the addresses of the lighting device controlling unit 20, the measurement management unit 21, and the area unit 1 in the area E. The addresses of the lighting device controlling unit 20, the measurement management unit 21, and the area unit 1 are used in the intermediate net Nm. The management unit 3 is configured to send a keepalive packet to each unit by the BACnet protocol, whereby the management unit 3 obtains the addresses. In addition, the management unit 3 has a collection-storage function of "collecting the information (including the address for recognition and sort of the device) required for management of the devices (lighting device Ld, measurement device Ms) constructing the inferior nets Ni1. Ni2 under the management of the lighting device controlling unit 20 and the measurement management unit 21 having addresses corresponding to the addresses stored in the storage unit 11 of the management unit 3", and "stores the information as the backup information in the storage unit 11". In this embodiment, "the information of the address in the intermediate net Nm" and "the information required for management of the devices constructing the inferior nets Ni1, Ni2" are included in the setting information. Therefore, the management unit 3 has a backup function of reserving the setting information.

The management unit 3 is configured to repeatedly send the acquisition request to each one of the lighting device controlling unit 20, the measurement management unit 21, and the area unit 1 in order to request each one of the lighting device controlling unit 20, the measurement management unit 21, and the area unit 1 to send the information for backup to the management unit 3. Each one of the lighting device controlling unit 20, the measurement management unit 21, and the area unit 1 make a judgment whether a current information for backup is varied or not from a previous information for backup. When there is no variation between the current information for backup and the previous information for backup, each one of the lighting device controlling unit 20, the measurement management unit 21, and the area unit 1 makes no response to the acquisition request. That is to say, each one of the lighting device controlling unit 20, the measurement management unit 21, and the area unit 1 makes a response to the acquisition request only when there is variation between the current information for backup and the previous information for backup. Consequently, the management unit 3 is configured to store the latest information with regard to the operation of the lighting device controlling unit 20, the measurement management unit 21, and the area unit 1 in the storage unit 11.

The router 6 is arranged between the superior net Ns and the intermediate net Nm. The router 6 is configured to prevent the leakage of the communication packet in the broadcast used in the intermediate net Nm to the outside of the area E. However, the communications between the superior management unit 4 and the area unit 1, the communication between the alternate unit 5 and the lighting device controlling unit 20, and the communication between the alternate unit 5 and the measurement management unit 21 are established without block of the router.

Figure 4:
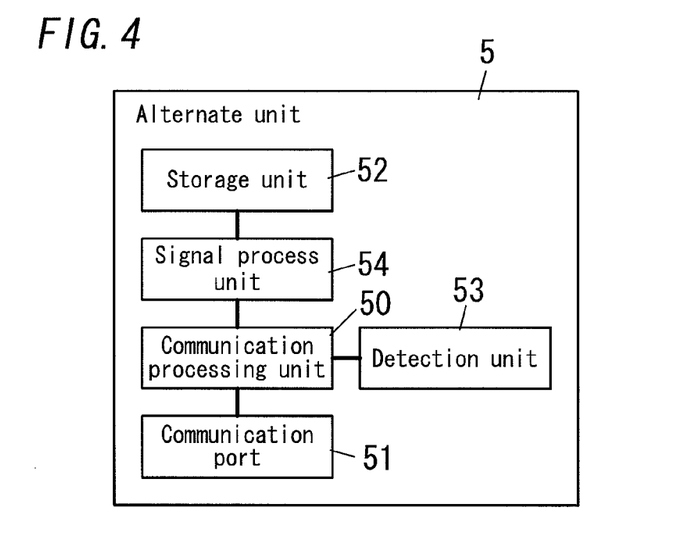
FIG. 4 shows a block diagram indicating the alternate unit of the above.

The alternate unit 5, as shown in FIG. 4, comprises a communication processing unit 50, a communication port 51, a storage unit 52, a detection unit 53, and a signal process unit 54. The communication port 51 is provided for establishment of the connection of the communication processing unit 50 to the outside cable. The storage unit 52 is configured to store the setting information of each one of the area units 1. The setting information is information provided for each one of the area units 1, and is used for communication of the area unit 1 to the units 2 (the lighting device controlling unit 20, the measurement management unit 21). The storage unit 52 defines a storage means in this invention. The detection unit 53 is configured to detect the failure of each one of the area units 1. The detection unit 53 defines a detection means in this invention. When the detection unit 53 detects the failure of any one of the area units 1, the signal process unit 54 controls the communication process unit 50 such that the communication process unit 50 start communicating with the unit 2 which is previously communicated with the area unit 1. Consequently, the management of the unit 2 is started.

The detection unit 53 sends the keepalive packet to each one of the area unit 1. The detection unit 53 detects the condition of each one of the area units 1 on the basis of the response with respect to the keepalive packet. That is to say, when the detection unit 53 receives the response to the keepalive packet from the area unit 1, the detection unit 53 makes a judgment of that the area unit 1 has a normal condition. In contrast, when the detection unit 53 receives no response to the keepalive packet from the area unit 1, the detection unit 53 makes a judgment of that the area unit 1 has the failure. It is possible to employ the alternate unit 5 being configured to generate alert indicative of the condition where the area unit 1 has abnormal condition (the area unit 1 has a failure).

In addition, the detection unit 53 is configured to send the keepalive packet to the area unit 1 even after the detection unit 53 detects the failure of any one of the area unit 1. Consequently, the detection unit 53 is configured to detect a restoration of the area unit 1 which previously has the failure on the basis of the response to the keepalive packet.

When the detection unit 53 detects the failure of any one of the area unit 1, the signal process unit 54 uses the setting information of the area unit 1 which has a failure to controls the communication processing unit 50 such that the communication processing unit 50 starts communicating with the unit 2 which previously communicate with the area unit 1. Consequently, the management of the unit 2 is started. The signal process unit 54 defines the alternate means in this invention.

In addition, the signal process unit 54 obtains the setting information of the area unit 1 which has the failure from the management unit 3. The signal process unit 54 defines the obtaining means. The setting information obtained by each the signal process unit 54 is stored in the storage unit 52.

In addition, when the detection unit 53 detects the restoration of the area unit 1 which previously has the failure, the signal process unit 54 controls the communication processing unit 50 such that the communication processing unit 50 stops communicating with the unit 2 (the lighting device controlling unit 20, the measurement management unit 21). When the communication processing unit 50 stops communicating with the unit 2, "the area unit 1 which is restored" resumes the communication with the unit 2.

As mentioned above, the alternate unit 5 manages the area E when the area unit 1 is disabled due to the failure. Consequently, it is possible to repair the failed area unit 1 and change the failed area unit 1 with a new area unit 1 without stopping of the operation of the device (the lighting device Ld, the measurement device Ms).

Figure 5:
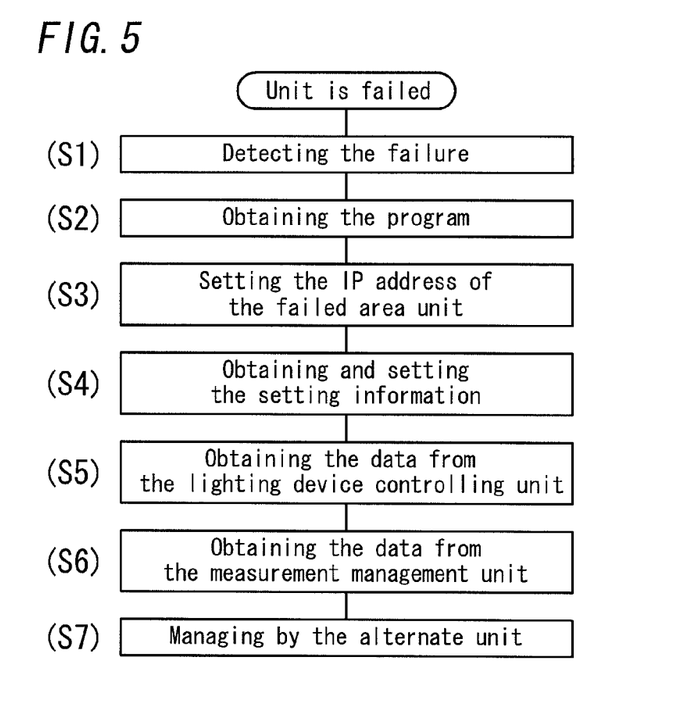
FIG. 5 shows a flow charge explaining the operation of the device management system when the area unit is failed.

Next, the explanation of the operation of the device management system in this embodiment when any one of the area units 1 is failed is made with FIG. 5 Each the area unit 1 communicates with each the unit (the lighting device controlling unit 20, the measurement management unit 21).

First, the alternate unit 5 sends the keepalive packet to each the area unit 1, and confirms the response, repeatedly. Consequently, the alternate unit 5 detects the failure of each the area unit 1 (S1). Then, the alternate unit 5 obtains the program which corresponds to a program type of the area unit 1 having the failure (S2).

When the alternate unit 5 obtains the program which is used in the area unit 1 having the failure, the alternate unit 5 sets the IP address of the area unit 1 (S3). Then, the alternate unit 5 obtains the setting information from the management unit 3 belonging to the area E including the area unit 1 having the failure, and set the setting information (S4). Subsequently, the alternate unit 5 collects the data from the lighting device controlling unit 20 and the measurement management unit which previously communicate with the area unit 1 having the failure, and performs the initialization (S5, S6). Then, the alternate unit 5 communicates with each one of the lighting device controlling unit 20 and the measurement management unit 21 to manage each one of the lighting device controlling unit 20 and the measurement management unit 21 (S7).

Figure 6:
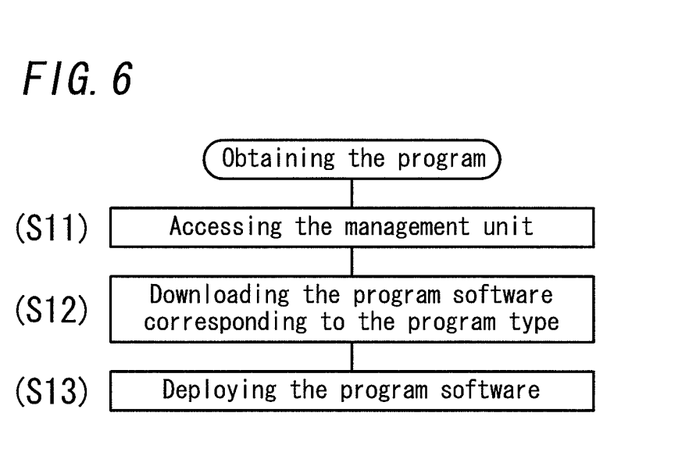
FIG. 6 shows a flow charge explaining the operation of obtaining the program in the device management system.

The obtaining method of obtaining the program by the alternate unit 5 in the step S2 is specifically explained. First, the alternate unit 5 accesses the management unit which belongs to the area E same as the area belonging to the area unit 1 having the failure (S11), and downloads the program software corresponding to the program type of the area unit 1 having the failure (S12). Then, the alternate unit 5 deploys the program software which is downloaded (S13).

Figure 7:
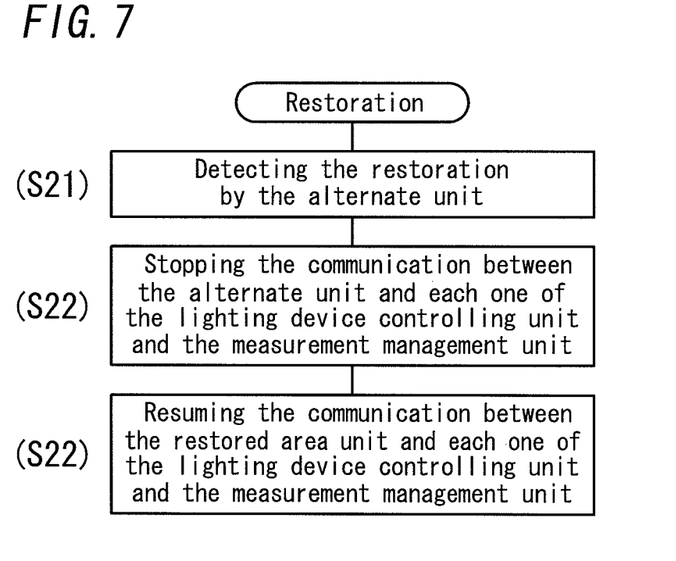
FIG. 7 shows a flow charge explaining the operation when the main unit having the failure is restored in the device management system.

The operation when the area unit 1 which is previously failed is restored is explained with FIG. 7. When the alternate unit 5 detects the restoration of the area unit 1 which is previously failed (S21), the alternate unit 5 stop communicating with the lighting device controlling unit 20 and the measurement management unit 21 (S22). The area unit 1 which is restored resumes the communication with the lighting device controlling unit 20 and also the measurement management unit 21 (S23).

As mentioned above, according to this embodiment, the device management system comprises the alternate unit 5. The alternate unit 5 is configured to manage the unit 2 (the lighting device controlling unit 20, the measurement management unit 21), similar to each the area unit 1. Consequently, when the area unit is failed, the alternate unit 5 manages the unit 2 instead of the area unit which has a failure. As a result, even if the area unit 1 fails, it is possible to continue managing the units 2 which is previously managed by the area unit has failure, without stopping the management of the units 2 which is previously managed.

In addition, the management unit 3 stores the setting information of each the area unit 1. Therefore, there is no need for the alternate unit 5 to store all the setting information in advance, even if each the setting information are different for each the area unit 1. Therefore, the alternate unit 5 is capable of obtaining the setting information from the management unit 3, if needed. That is, this configuration makes it possible to reduce the load of the alternate unit 5.

In addition, when the area unit 1 which previously has the failure is restored, the alternate unit 5 stops communicating with the unit 2. Consequently, when the area unit 1 is newly failed, the alternate unit 5 is capable of acting as the area unit 1, instead of the area unit 1 which is newly failed.

(Second Embodiment)

The device management system of the second embodiment is different from the device management system of the first embodiment in the area units 1, 1 which have priorities, respectively. It is noted that the components in common with the components of the first embodiment is symbolized by the same reference numerals. Therefore, the explanation of the components in common with the components of the first embodiment is omitted.

In the alternate unit 5 of this embodiment, when the detection unit 53 detects the failures of a plurality of the area units 1, 1, the signal process unit 54 uses one of the setting information of the area unit 1 having the priority higher than the priority of the other of the setting information of the area unit 1 to control the communication processing unit 50 such that the communication processing unit 50 starts communicating with the unit 2 (the lighting device controlling unit 20 and the measurement management unit 21) which previously communicates with the area unit 1 having the priority higher than the priority of the other of the setting information of the area unit 1. Consequently, the alternate unit 5 starts managing the unit 2 which previously communicates with the area unit 1 having the priority higher than the priority of the other of the setting information of the area unit 1.

As mentioned above, according to this embodiment, when a plurality of the area units 1, 1 have failure, the alternate unit 5 replaces the area unit 1 having a highest priority. Consequently, it is possible to continuously manage the critical unit 2 (the lighting device controlling unit 20 and the measurement management unit 21), without stopping the management of the critical unit 2.

(Third Embodiment)

In the first embodiment and the second embodiment, when the area unit 1 is failed, the alternate unit 5 replaces the area unit 1 to manage the unit 2 (the lighting device controlling unit 20 and the measurement management unit 21). However, in the third embodiment, the explanation in a case where the unit 2 (the lighting device controlling unit 20 and the measurement management unit 21) is failed is made.

Figure 8:
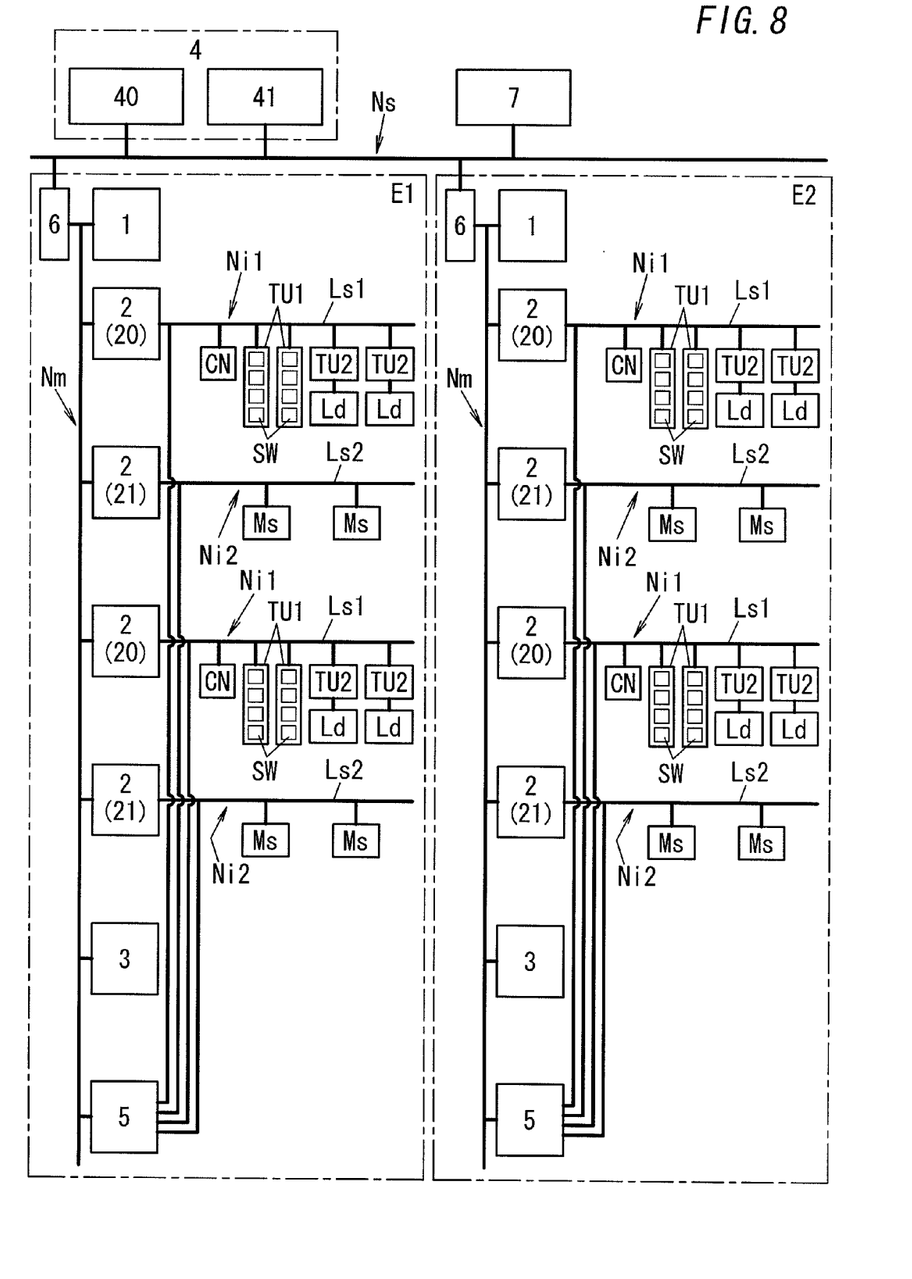
FIG. 8 shows a schematic diagram of the device management system in the third embodiment.

As shown in FIG. 8, the device management system in the third embodiment is different from the device management system of the first embodiment in the following feature of that the alternate unit 5 is connected to the intermediate net Nm, instead of the superior net Ns. It is noted that the components in common with the components of the first embodiment is symbolized by the same reference numerals. Therefore, the explanation of the components in common with the components of the first embodiment is omitted.

In the alternate unit 5 of this embodiment, the detection unit 53 in FIG. 4 sends the keepalive packet to each the unit 2, and detects the condition of each the unit 2 on the basis of the response to the keepalive packet. That is to say, the detection unit 53 is configured to make a judgment that the unit 2 has the normal condition when the detection unit 53 receives the response to the keepalive packet. In contrast, the detection unit 53 is configured to make a judgment that the unit has the failure when the detection unit 53 detects receives no response to the keepalive packet.

In addition, the detection unit 53 is configured to send the keepalive packet to the unit 2 even after any one of the unit 2 is failed. Consequently, the detection unit 53 is configured to detect the restoration of the unit which is previously failed on the basis of the existence or nonexistence of the response to the keepalive packet.

The signal process unit 54 of the alternate unit 5 in this embodiment is configured to make a judgment that the unit 2 has the failure when the detection unit 53 detects no response to the keepalive packet from any one of the units 2 (the lighting device controlling unit 20 and the measurement management unit 21). When the signal process unit 54 makes the judgment that the unit 2 has the failure, the signal process unit 54 notices an occurrence of the failure of the superior management device 4. In addition, the signal process unit 54 starts managing the device, instead of the unit 2 which has a failure. (The signal process unit 54 starts communicating with the device, instead of the unit 2 which has the failure.)

In this embodiment, the units 2 (the lighting device controlling unit 20, the measurement management unit 21) correspond to the main units. The devices in this embodiment correspond to the sub units. That is to say, in this embodiment, the device is integral with the sub unit.

In addition, the signal process unit 54 is configured to obtain "the setting information of the unit 21 which has the failure" from the management unit 3. The signal process unit 54 is configured to store the setting information in the storage unit 52.

In addition, when the detection unit 53 detects the restoration of the unit which is failed, the signal process unit 54 controls the communication processing unit 50 such that the communication processing unit 50 stops managing the devices. (When the detection unit 53 detects the restoration of the unit which is failed, the signal process unit 54 controls the communication processing unit 50 such that the communication processing unit 50 stops communicating with the devices.) When the communication processing unit 50 stops managing the devices, the unit 2 which is restored resumes the management of the device.

As mentioned in this embodiment, the device management system comprises the alternate unit 5 which is configured to manage the devices, similar to the unit 2 (the lighting device controlling unit 20, the measurement management unit 21). Therefore, when the unit 2 has the failure, the alternate unit 5 manages the devices instead of the unit 2 having the failure. As a result, according to this embodiment, it is possible to continuously manage the device which is managed by the unit having the failure now without stopping the management of the device, even if the unit has the failure.

Furthermore, there is a case where the each the unit 2 has the setting information different for each the unit 2. However, there is no need for the alternate unit 5 to store all the setting information in the alternate unit 5 in advance by the management unit which stores the setting information of each the unit 2. The alternate unit 5 is able to obtain the setting information from the management unit 3 when needed. Therefore, it is possible to reduce the load of the alternate unit 5.

Furthermore, when the unit 2 which has the failure is restored, the alternate unit 5 stops controlling the devices.

Therefore, the alternate unit is capable of replacing any one of the units 2 when any one of the units 2 is newly failed.

It is noted that the following modification of the embodiment is capable of employing instead of this embodiment. That is to say, a plurality of the units 2, 2 (the lighting device controlling units 20, 20 and the measurement management units 21, 21) shown in FIG. 8 is provided with priorities in advance. (In the drawing, each the area includes four units.)

In the alternate unit 5, when the detection unit 53 detects the failures of equal to or more than two devices, the signal process unit 54 uses "the setting information of the unit 2 having the highest priority among the units having failures" to communicate with the devices which previously communicate with the device having the highest priority. Consequently, the management of the device is started.

As mentioned above, when a plurality of the units 2 are failed, the alternate unit 5 replaces the unit 2 having the highest priority. Consequently, it is possible to continuously manage the critical device without stopping the management.

The invention claimed is:

1. A device management system for managing a plurality of devices respectively belonging to a plurality of management groups different from each other, said device management system comprising:
   a plurality of main units, a plurality of sub units, and an alternate unit, each of the main units comprises a respective main unit signal process unit including a respective main unit CPU, each of the sub units comprises a sub unit signal process unit including a respective sub unit CPU,
   a plurality of said main units being disposed in the plurality of management groups, respectively,
   a plurality of said main units comprises a first main unit disposed in a first management group, and a second main unit disposed in a second management group,
   a plurality of said sub units comprising at least one first sub unit disposed in the first management group, and at least one second sub unit disposed in the second management group,
   said first main unit being configured to perform communication with said first sub unit so as to perform management of said first sub unit,
   said second main unit being configured to perform communication with said second sub unit so as to perform management of said second sub unit,
   said first sub unit is connected to a first device belonging to said first management group,
   said first sub unit is configured to manage said first device according to the management of said first main unit,
   said second sub unit is connected to a second device belonging to said second management group,
   said second sub unit is configured to manage said second device according to the management of said second main unit,
   said alternate unit comprising a detection means and an alternate means,
   said detection means is configured to detect a failure of said first main unit,
   said detection means being configured to detect a failure of said second main unit,
   said alternate means being configured to perform communication with said first sub unit so as to perform management of said first sub unit when said detection means detects the failure of said first main unit,
   said alternate means being configured to perform communication with said second sub unit so as to perform management of said second sub unit when said detection means detects the failure of said second main unit.

2. The device management system as set forth in claim 1, wherein said first main unit having a priority which is higher than a priority of said second main unit,
   said alternate means being configured to perform the communication with said first sub unit so as to perform the management of said first sub unit when said detection means detects the failures of said first main unit and said second main unit.

3. The device management system as set forth in claim 2, further comprising an information server,
   said information server having a first setting information and a second setting information,
   said first setting information is used when said first main unit performs the communication with said first sub unit,
   said second setting information is used when said second main unit performs the communication with said second sub unit,
   said alternate unit further comprising an obtaining means and a storage means,
   said obtaining means being configured to obtain said first setting information from said information server when said detection means detects the failure of said first main unit,
   said obtaining means being configured to obtain said second setting information from said information server when said detection means detects the failure of said second main unit,
   said storage means being configured to store said first setting information which is obtained by said obtaining means,
   said storage means being configured to store said second setting information which is obtained by said obtaining means,
   said alternate means being configured to use said first setting information in order to perform the communication with said first sub unit for the management of said first sub unit when said detection means detects the failure of said first main unit,
   said alternate means being configured to use said second setting information in order to perform the communication with said second sub unit for the management of said second sub unit when said detection means detects the failure of said second main unit.

4. The device management system as set forth claim 2, wherein
   said detection means is configured to detect a restoration of said first main unit when said first main unit restores, and is configured to detect a restoration of said second main unit when said second main unit restores,
   said alternate means being configured to stop the communication with said first sub unit when said detection means detects the restoration of said first main unit,
   said alternate means being configured to stop the communication with said second sub unit when said detection means detects the restoration of said second main unit,
   said first main unit being configured to resume the communication with said first sub unit when said first main unit is restored, and
   said second main unit being configured to resume the communication with said second sub unit when said second main unit is restored.

5. The device management system as set forth claim 3, wherein
   said detection means is configured to detect a restoration of said first main unit when said first main unit restores, and is configured to detect a restoration of said second main unit when said second main unit restores, said alternate means being configured to stop the communication with said first sub unit when said detection means detects the restoration of said first main unit, said alternate means being configured to stop the communication with said second sub unit when said detection means detects the restoration of said second main unit, said first main unit being configured to resume the communication with said first sub unit when said first main unit is restored, and said second main unit being configured to resume the communication with said second sub unit when said second main unit is restored.

6. The device management system as set forth in claim 1, wherein said alternate means is configured, when said detection means detects the failure of said first main unit, to perform communication with said first sub unit so as to perform management of said first sub unit according to a similar management manner with that by said first main unit, instead of said first main unit, and said alternate means is configured, when said detection means detects the failure of said second main unit, to perform communication with said second sub unit so as to perform management of said second sub unit according to a similar management manner with that by said second main unit, instead of said second main unit.

* * * * *